United States Patent
Boyd

(10) Patent No.: US 7,623,352 B2
(45) Date of Patent: Nov. 24, 2009

(54) POWER SUPPLY AND SPEAKERPHONE FOR HANDHELD DEVICES

(76) Inventor: Karen A. Boyd, 230 NW. 97th St., Miami, FL (US) 33150

( * ) Notice: Subject to any disclaimer, the term of this patent is extended or adjusted under 35 U.S.C. 154(b) by 214 days.

(21) Appl. No.: 11/821,064

(22) Filed: Jun. 22, 2007

(65) Prior Publication Data

US 2008/0316713 A1 Dec. 25, 2008

Related U.S. Application Data

(60) Provisional application No. 60/771,843, filed on Feb. 10, 2006.

(51) Int. Cl.
*H05K 5/00* (2006.01)
(52) U.S. Cl. .................................. 361/752; 361/728
(58) Field of Classification Search ................. 361/728, 361/679, 752
See application file for complete search history.

(56) References Cited

U.S. PATENT DOCUMENTS

| | | | |
|---|---|---|---|
| 4,360,860 A | 11/1982 | Johnson et al. | |
| 4,930,156 A * | 5/1990 | Norris | 379/388.02 |
| 5,644,207 A | 7/1997 | Lew et al. | |
| 5,949,215 A | 9/1999 | Takakura | |
| 6,380,711 B2 * | 4/2002 | Fischer et al. | 320/106 |
| 6,707,924 B1 * | 3/2004 | Okiebisu | 381/385 |
| 6,824,917 B2 | 11/2004 | Aaltonen et al. | |
| 6,849,960 B2 | 2/2005 | Hartman et al. | |
| 6,850,039 B2 | 2/2005 | Popescu et al. | |
| 7,256,347 B2 * | 8/2007 | Gustavsson | 174/74 R |
| 7,382,891 B2 * | 6/2008 | Weikel et al. | 381/384 |

* cited by examiner

*Primary Examiner*—Dean A. Reichard
*Assistant Examiner*—Yuriy Semenenko

(57) ABSTRACT

The invention claimed herein and depicted in FIGS. 1 through 4 presents a combined alternate power source and speakerphone device for handheld devices such as cellular telephones. Housing 2 contains battery compartment 28 that accepts batteries such as "AA" or "AAA" cells, which are installed by opening sliding cover 4. Electrical power and speakerphone circuit board 24 are also mounted within housing 2, while on/off switch 8, volume control 10, speaker 12, microphone 14 and cord 16 are mounted onto the housing's outer shell. Cord 16 features socket 18 at its terminal end which accepts a plurality of interchangeable adapter plugs 20 that accommodate the input sockets of a variety of handheld devices. When this invention is installed onto a device such as a cellular telephone, the user can select the mode of operation that provides an auxiliary source of operating power and/or an external speaker and microphone for hands-free use of said device.

2 Claims, 2 Drawing Sheets

POWER SUPPLY AND SPEAKERPHONE FOR HANDHELD DEVICES

CROSS-REFERENCE TO RELATED APPLICATIONS

This application is preceded by provisional patent U.S. 60/771,843 filed on Feb. 10, 2006 which embodies the present design.

STATEMENT REGARDING FEDERALLY SPONSORED RESEARCH OR DEVELOPMENT

Not Applicable

REFERENCE TO SEQUENCE LISTING, A TABLE OR A COMPUTER LISTING COMPACT DISK APPENDIX

Not Applicable

BACKGROUND OF THE INVENTION

Past inventions have demonstrated a variety of back-up power supplies for cellular phones. Devices such as that disclosed by Aaltonen U.S. Pat. No. 6,824,917 present the typical rechargeable battery pack. Hartman et al U.S. Pat. No. 6,849,960 and Hutchman U.S. Pat. No. 6,133,642 disclose auxiliary power supplies that utilize solar power of a hand-cranked generator. These devices do not disclose a combined auxiliary power source using standard batteries and speakerphone for cellular phones.

BRIEF SUMMARY OF THE INVENTION

This invention consists of the following components as depicted in FIGS. 1 through 4. The invention described herein provides the combined ability to (a) power a handheld device such as a cellular phone with standard batteries; (b) provide a hands-free speakerphone option, and (c) exhibit compatibility with a variety of devices via interchangeable plugs. These features allow greatly increased usability of a cellular phone or other handheld device (such as PDAs and MP3 players) in everyday and emergency situations.

DETAILED DESCRIPTION OF THE INVENTION

Figure 1:
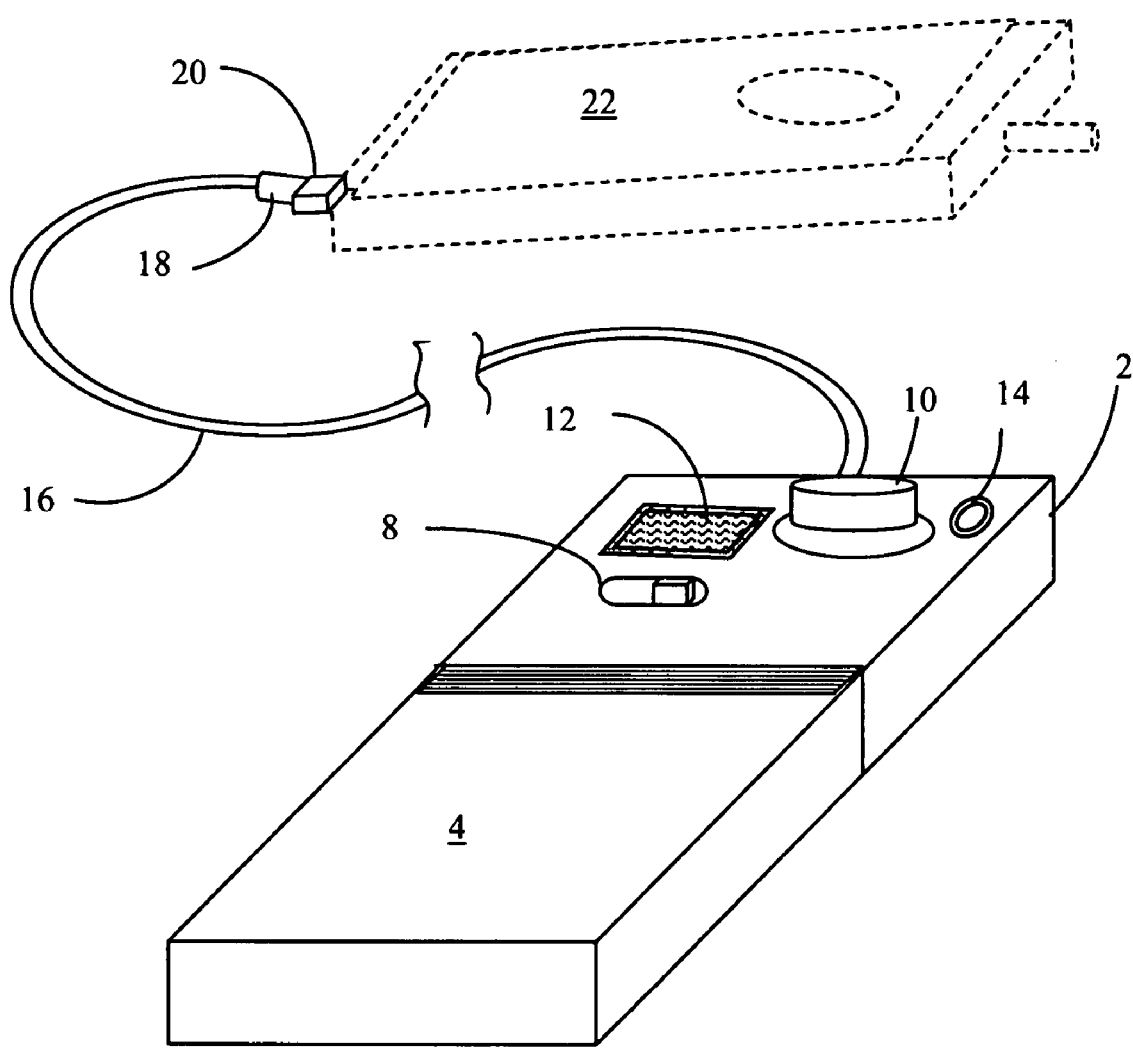
FIG. 1 depicts a ¾ perspective view of the device installed onto a cellular phone.
Figure 2:
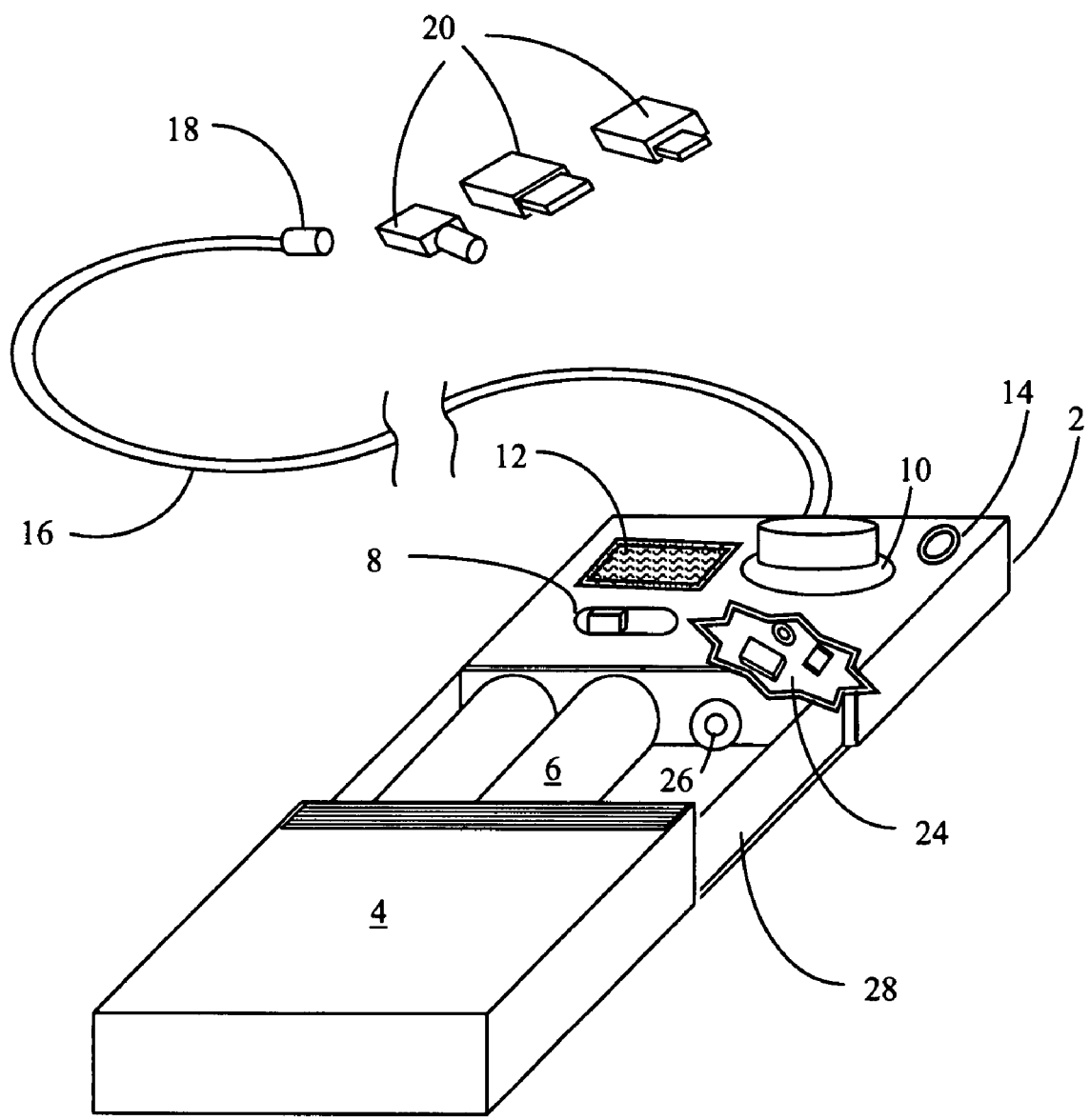
FIG. 2 depicts a ¾ perspective and cutaway view of the device with open cover panel.

The description presented herein and illustrated by FIGS. 1 and 2 presents the preferred embodiment of this device. Housing 2 is molded from a rigid material such as plastic to form a box that is enclosed on its sides. Said box is open on its obverse face but closed on its reverse face. The posterior end of housing 2 contains battery compartment 28 and terminals 26 which accepts batteries 6 such as standard "AA" or "AAA" cells. This is covered by cover 4 which is attached to housing 2 via a sliding hinge means. The anterior end of housing 2 has its obverse face closed by a panel that features control switch 8, volume control 10, speaker 12 and microphone 14. Cord 16 exits from the anterior end of housing 2 and features socket 18 at its terminal end which accepts a plurality of interchangeable adapter plugs 20. Adapter plugs 20 can be configured to match the proprietary input jacks of specific device manufacturers as well as universal, metric, USB or other such ports. Power and speakerphone circuit board 24 is mounted within housing 2 and connected to the aforementioned electrical components.

The primary embodiment of this device is to provide users of cellular phones with an external microphone and speaker and the option of powering said phones with standard batteries. User opens cover 4, installs a plurality of batteries into battery compartment in housing 2, then slides said cover into its closed position. User installs into socket 18 an adapter plug 20 which corresponds to the communication/power ports of their particular cellular phone. Said adapter plug is then installed into the cellular phone 22. This deactivates the cellular phone's built-in speaker and microphone and allows speaker 12 and microphone 14 of this device to provide hands-free communication. User then selects the mode of operation by using control switch 8 to activate the auxiliary battery power function, or volume control 10 to regulate the speaker phone function.

Although this description cites the use of this device as an accessory for cellular telephones, this is not intended to limit the scope of the invention. This device can also be used with other products such as MP3 players and telecommunications/data devices.

I claim:

1. A combined a cellular telephone auxiliary battery and a speaker phone device consisting of:
    a) a housing featuring a posterior cavity that contains electrical terminals which can accommodate a plurality of batteries, with said cavity being accessible via an open obverse face;
    b) a cover that is mounted onto said housing via a sliding hinge means, whereby said cover can be moved from a position of covering the open obverse face of the housing's posterior cavity to provide access to said cavity; and
    d) a closed anterior cavity of said housing which contains an electrical power and speakerphone circuit board, with a speaker volume control, a microphone, speaker and a control switch mounted within an outer shell of said housing.
2. A device described in claim 1 with the inclusion of:
    a) an electrical cord, which is attached at a posterior end to the aforementioned power and speakerphone circuit board and extends through an aperture in the device's housing; and
    c) a receptacle mounted onto an anterior end of the electrical cord which accept a plurality of interchangeable plugs to accommodate a plurality of input jacks of a variety of telecommunication products.

* * * * *